Figure 1:
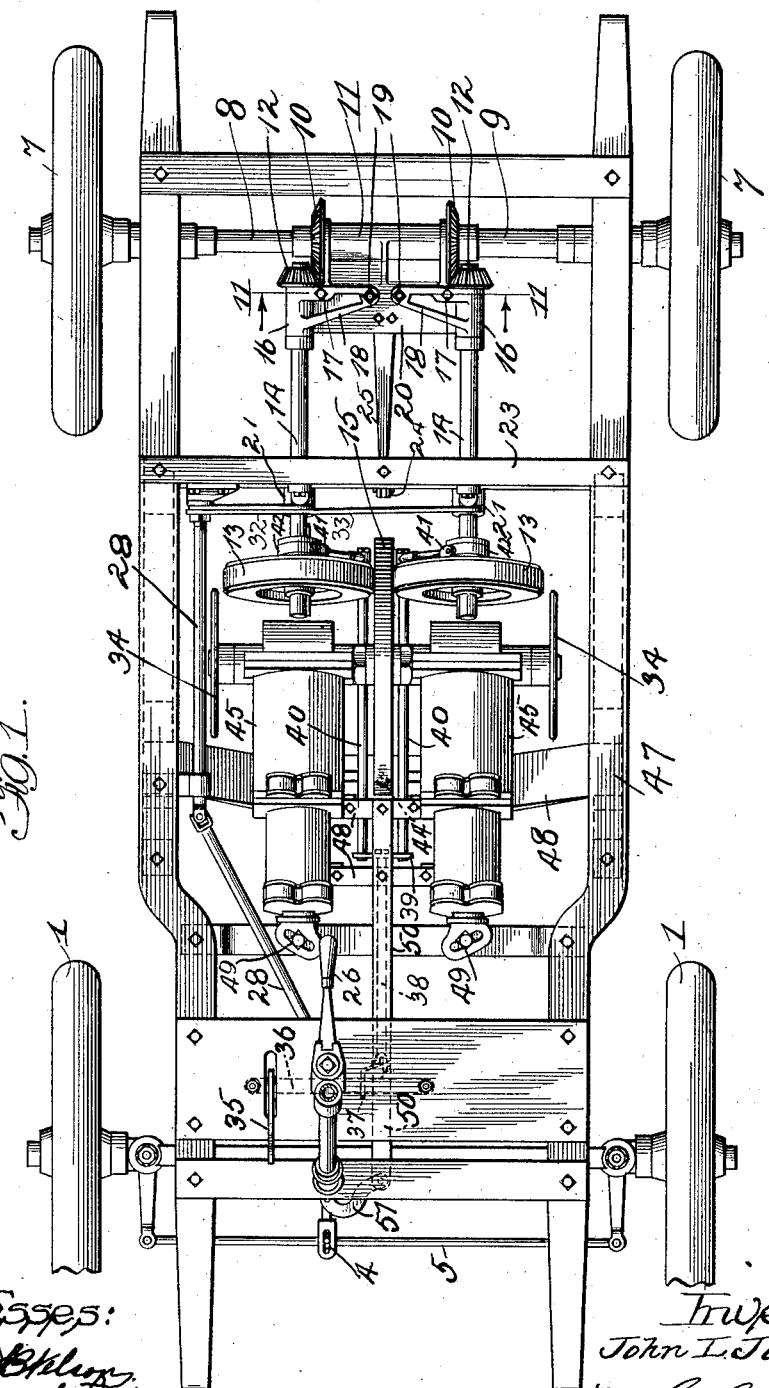

J. L. JOHNSON.
AUTOMOBILE.
APPLICATION FILED DEC. 15, 1909.

1,002,915.

Patented Sept. 12, 1911.
5 SHEETS—SHEET 1.

Witnesses:

Inventor:
John L. Johnson
By G. L. Cragg
Atty.

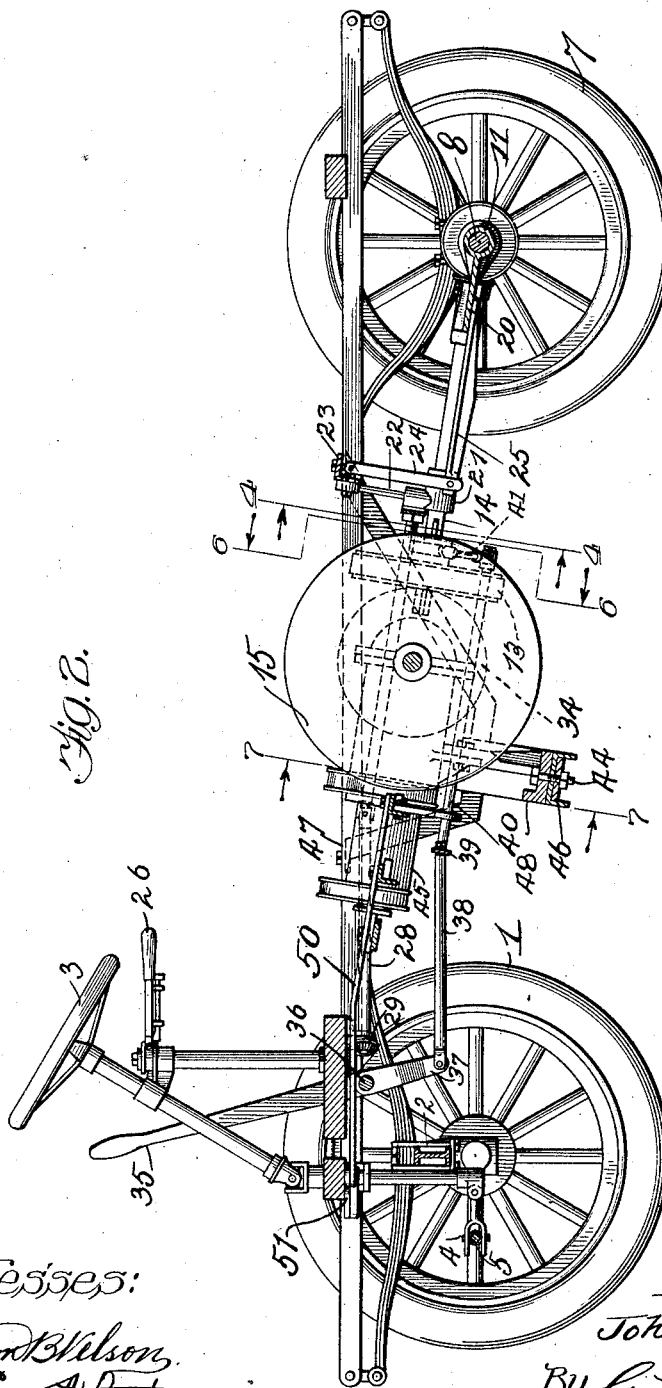

J. L. JOHNSON.
AUTOMOBILE.
APPLICATION FILED DEC. 15, 1909.
1,002,915.
Patented Sept. 12, 1911.
5 SHEETS—SHEET 3.
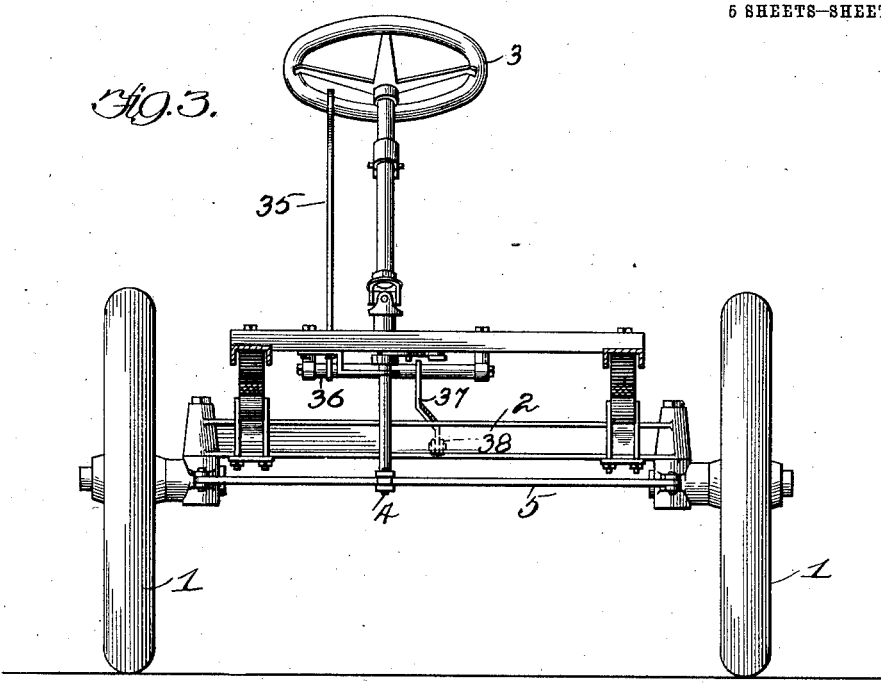
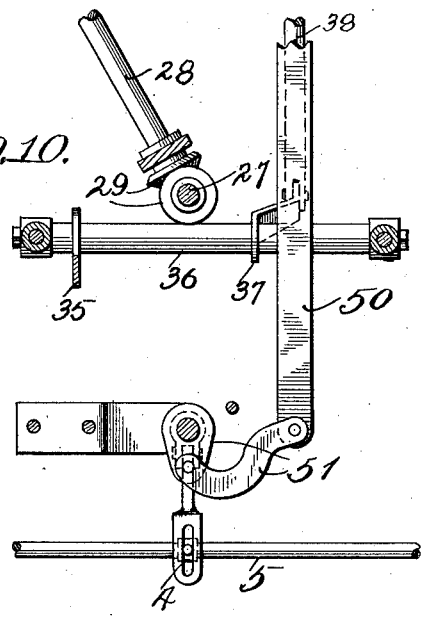
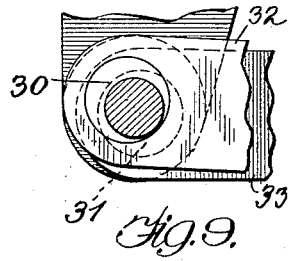
Witnesses:
Edwin B. Nelson
R. E. Atherton
Inventor:
John L. Johnson.
By G. L. Cragg
Atty.

J. L. JOHNSON.
AUTOMOBILE.
APPLICATION FILED DEC. 15, 1909.
1,002,915.
Patented Sept. 12, 1911.
5 SHEETS—SHEET 4.
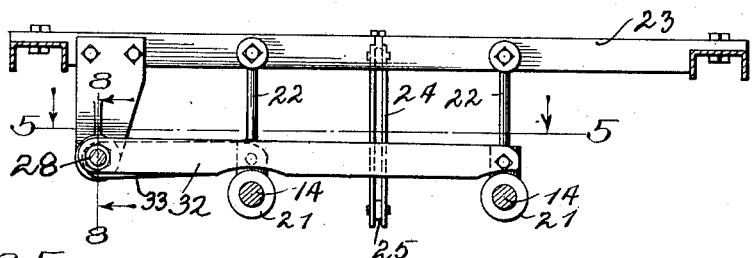
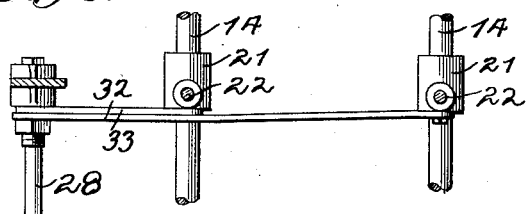
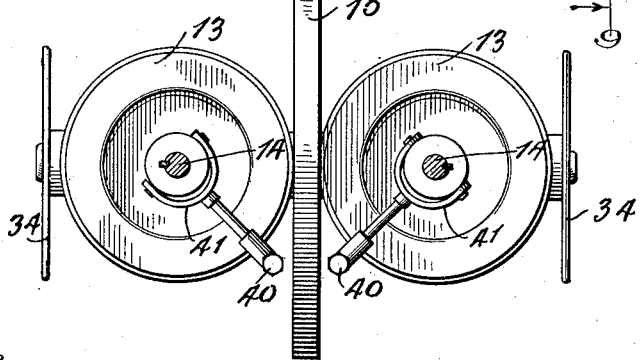
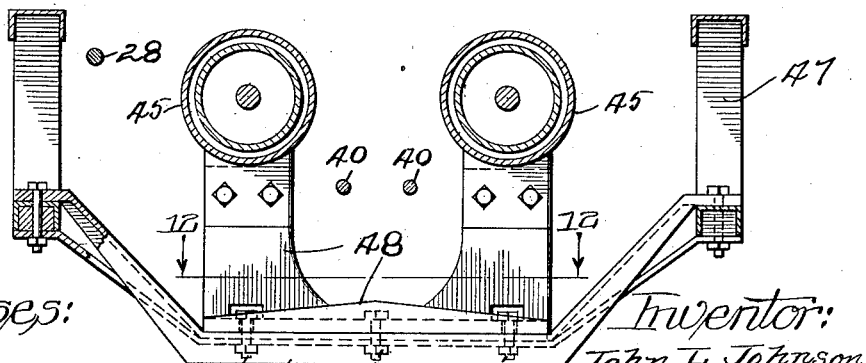
Witnesses:
Edwin B. Nelson
R. E. Atherton
Inventor:
John L. Johnson
By G. L. Cragg
Atty.

J. L. JOHNSON.
AUTOMOBILE.
APPLICATION FILED DEC. 15, 1909.
1,002,915.
Patented Sept. 12, 1911.
5 SHEETS—SHEET 5.
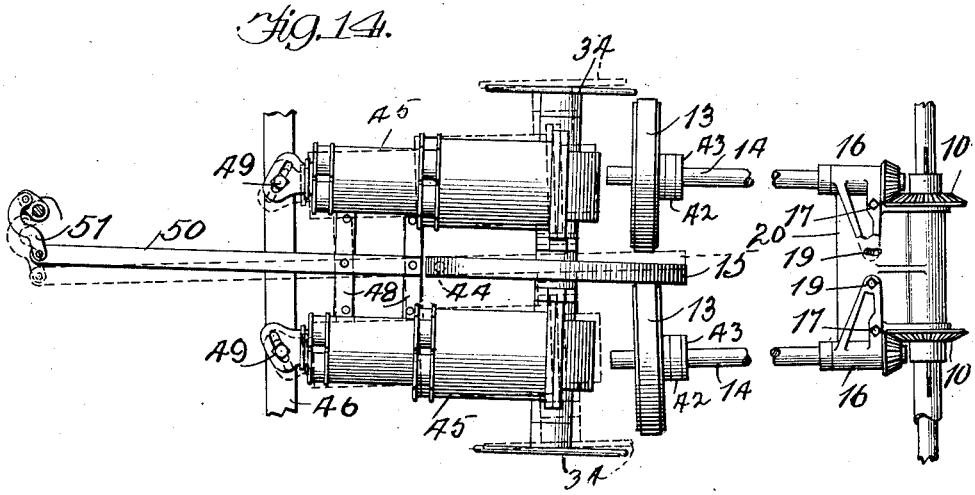
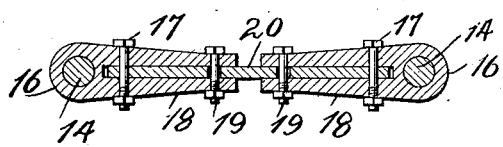
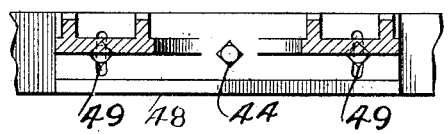
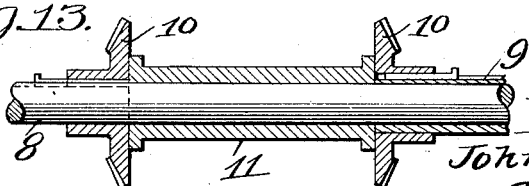
Witnesses:
Edwin B Nelson
R. E. Atherton
Inventor:
John L. Johnson.
By G. L. Cragg
Atty.

UNITED STATES PATENT OFFICE.

JOHN L. JOHNSON, OF CHICAGO, ILLINOIS, ASSIGNOR OF ONE-HALF TO GEORGE J. REELING, OF CHICAGO, ILLINOIS.

AUTOMOBILE.

1,002,915.          Specification of Letters Patent.      Patented Sept. 12, 1911.

Application filed December 15, 1909. Serial No. 533,166.

*To all whom it may concern:*

Be it known that I, JOHN L. JOHNSON, a citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to automobiles, and has a number of objects and advantages in view which will be best understood by a description of the preferred embodiment of the invention shown in the accompanying drawings, in which—

Figure 1 is a plan view of the running gear portion of an automobile constructed in accordance with the invention; Fig. 2 is a sectional elevation of the structure shown in Fig. 1; Fig. 3 is a front view; Fig. 4 is a view on line 4—4 Fig. 2; Fig. 5 is a view on line 5—5 Fig. 4; Fig. 6 is a view on line 6—6 Fig. 2; Fig. 7 is a view on line 7—7 Fig. 2; Fig. 8 is a view on line 8—8 Fig. 4; Fig. 9 is a view on line 9—9 Fig. 8; Fig. 10 is a view on a larger scale of some of the parts indicated in Fig. 1; Fig. 11 is a view on line 11—11 Fig. 1; Fig. 12 is a view on line 12—12 Fig. 7; Fig. 13 is a view in elevation, partially in section of a portion of the driving mechanism preferably located at the rear of the machine, and Fig. 14 is a plan view that is somewhat diagrammatic to illustrate clearly some of the features of the invention.

Like parts are indicated by similar characters of reference throughout the different figures.

The type of automobile illustrated is one in which the forward vehicle wheels 1 1 determine the direction of travel of the machine by the positions to which they are rotatably adjusted on their pivotal supports at the end of a fixed axle 2, a steering wheel 3 having its flexible shaft in pin and slot connection 4 with a transversely movable shifting bar 5 connected with the knuckle portions of the wheels, all as is well understood. The rear vehicle wheels 7 constitute the driving wheels of the machine. One of these wheels is fixed upon the end of a shaft 8 (Fig. 13) and the other is fixed upon a quill shaft or sleeve 9 inclosing the shaft, it being immaterial which wheel 7 is mounted on either shaft. Driving power is communicated to the shafts preferably by bevel gears 10 fixed upon the shafts 8 and 9, these gears being spaced apart by a spacer 11, and having power communicated to them in any suitable way, the arrangement later described being preferred. Each of the shafts 8 and 9 is adapted to have the power supplied thereto regulated. In this way the automobile is readily permitted to round curves without undue wear upon the rear wheel that is on the inside of the curve. By the mechanism described I avoid the use of differential couplings.

The gears 10 are desirably in mesh with driving gears 12 that are driven by some suitable agency, as, for example, the frictionally driven disks 13 that are mounted upon the shafts 14 that carry the gears 12. These frictionally driven disks 13 are desirably driven by a driving friction disk 15 common thereto, and in order that each of the disks 13 may be disassociated from the disk 15 said disks 13 are carried on the free end portions of their shafts 14 and the bearings 16 for the shafts 14 are pivoted at 17 so that the shafts 14 and the disks 13 carried thereby may be moved toward and from the disk 15 by mechanism later to be described. The bearings 16 are provided with extension 18 to accommodate the pivotal connections 17 and also to afford pin and slot connections 19 between the bearings and the extension 20 of the spacer 11. In order that the speed with which the disks 13 and parts operated thereby may be varied with respect to the speed of the disk 15 which is preferably constant, said disks 13 are splined to their shafts so as to be capable of movement along the shafts by means of mechanism to be described, to bring the disks 13 toward and from the center of the disk 15 over its plane faces, with obvious results. There are bearings 21 to the rear of the splined portions of the shafts 14 which are suspended by links 22 pivotally connected at their upper ends with a frame brace member 23, this construction permitting the shafts 14 to swing to a slight extent about the pivots 17. The brace member 23 also takes part in supporting the bearings 16 and associate parts, a link 24 having pivotal connection with the brace 23 and the forward end of a tongue 25 secured at its rear end to the extension 20 of the distance preserving element 19. The transmission mechanism at the rear of the machine is thus properly supported in order that it may properly operate and be capable of adjustment.

I will now describe the mechanism for moving the friction disks 13 toward and from the driving disk 15 and for moving said disks 13 along their shafts 14. A starting and backing lever 26 is shown as being rotatable in a horizontal plane, said lever being fixed to the upper end of a shaft 27 (Fig. 10) that is brought into driving relation with the forward end of a flexible shaft 28 by means of bevel gears 29. The rear end of shaft 28 carries two eccentrics 30 and 31 (Figs. 8 and 9) that are in actuating relation with bars 32, 33, the eccentrics being shown as working within ends of these bars. The other ends of the bars 32, 33 are connected respectively with upper extensions of the bearings 21, so that as said bars are moved by their actuating eccentrics the bearings 21 are swung upon their links 22, the bearings 21 carrying with them the shafts 14 journaled therein whereby the disks upon the splined portions of said shafts are brought toward and from the driving disk 15. The relation of the eccentrics to each other is most clearly revealed in Figs. 8 and 9, where they are shown as being in such relation that a movement of the lever 26 to a forward position will cause both disks 13 to engage the driving disk 15 with substantially equal force, whereby the driving wheels 7 are driven through the medium of the parts intervening between them and the disks 13, as will be apparent from the drawings. The movement of said lever 26 to an "idle" position will so adjust the described eccentrics that the disks 13 will be moved away from the driving disk 15, and a movement of the lever 26 to a "backing" position will bring the disks 13 into engagement with the outer driving disks 34 which rotate in the same direction with and are preferably co-axial with disk 15 so as to reverse the directions of rotation of the disks 13. Inasmuch as the "backing" should be done under comparatively slow speed, the disks 34 are of smaller diameter than the disk 15.

The speed with which the wheels 7 are driven by the disks 13 depends upon the distance between said disks and the common axis of the disks 15 and 34, which distance is varied by movement of the disks 13 along the splined portions of the shafts 14 as has been explained, the mechanism by which this result is accomplished being clearly illustrated in Figs. 1, 2, 3, 6 and 10. A speed lever 35 is mounted upon a rock shaft 36 to which is secured an actuating arm 37 connected at its lower end with the front end of a shaft 38, which is united at its other end with a cross piece 39 (Figs. 1 and 2). Two rods 40 extend from the cross piece 39 to two forks 41 that are in engagement with rings 42 (Figs. 7 and 14) in slipping relation with the hubs 43 of the disks 13. It is obvious that movement of the speed lever will be accompanied by movement of the disks 13 along their shafts 14 to secure changes of speed of the wheels 7 driven by said disks 13 all as has been explained.

In order to avoid undue wear between the driving disks 15 and one disk 13 when the other disk 13 is driving an outer wheel 7 in rounding a curve, and in order to avoid the necessity of shifting the disk 13, that is coupled with the inner wheel 7, away from the disk 15 to accomplish this result, I provide the mechanism that now will be described.

The driving friction disks 15 and 34 are mounted to be adjusted bodily about a pivot 44 on that side of the common axis of these disks which is opposite the side where the disks 13 are disposed. In order to maintain a simple construction the engine 45 which drives these disks is also bodily movable therewith about said pivot 44. These characteristics are illustrated in Figs. 1, 2, 7, 12 and 14. A framework 46 secured to the running gear frame 47 supports the engine framework 48 which is adapted to swing upon the framework 46 about the pivot 44. Pin and slot connections 49 are also provided between the frames 46 and 48 to preserve the desired relationship between said frames.

The engine framework is coupled with the steering wheel shaft by means of a tongue 50 rigidly secured at one end to said frame work and connected at its other end with said shaft through the intermediation of link mechanism 51. When the automobile is moving straight ahead the tongue 50 is in its central position in which the engine is so adjusted that both disks 13 are driven thereby. When however the steering wheel is turned so as to enable the automobile to round a curve the tongue 50 is swung out of its central position, (see Fig. 14 for example) whereby the driving disk 15 is forced more strongly against one disk 13 and is moved away from the remaining disk 13, whereby but the first disk 13 is driven, the other disk remaining idle. In this way only the wheel 7 that is upon the outside of a curve is positively driven, the advantage which has been hitherto described being thereby gained.

I claim:

1. An automobile including its steering mechanism, a swingingly mounted motor driven friction disk, two additional friction disks that are flexibly supported and which are independently in driving relation with the two driving vehicle wheels of the automobile and both of which are driven by the aforesaid friction disk, and means operated by the steering mechanism when guiding the automobile about curves for swinging the driving friction disk in one direction or the other and consequently away from one or the other of the second aforesaid friction disks according to the direction of the curve.

2. An automobile including its steering mechanism, a swingingly mounted motor driven friction device, two additional friction devices independently in driving relation with the two driving vehicle wheels of the automobile and both of which are driven by the first aforesaid friction device, and means operated by the steering mechanism when guiding the automobile about curves for swinging the driving friction device in one direction or the other and consequently away from one or the other of the second aforesaid friction devices according to the direction of the curve.

3. An automobile including its steering mechanism, a movably mounted motor driven friction disk, two additional friction disks that are flexibly supported and which are independently in driving relation with the two driving vehicle wheels of the automobile and both of which are driven by the aforesaid friction disk, and means operated by the steering mechanism when guiding the automobile about curves for moving the driving friction disk in one direction or the other and consequently away from one or the other of the second aforesaid friction disks according to the direction of the curve.

4. An automobile including its steering mechanism, a movably mounted motor driven friction device, two additional friction devices independently in driving relation with the two driving vehicle wheels of the automobile and both of which are driven by the first aforesaid friction device, and means operated by the steering mechanism when guiding the automobile about curves for moving the driving friction device in one direction or the other and consequently away from one or the other of the second aforesaid friction devices according to the direction of the curve.

5. An automobile including a swingingly mounted motor driven friction disk, two additional friction disks that are flexibly supported and each of which is independently in driving relation with the two driving vehicle wheels of the automobile and both of which are driven by the aforesaid friction disk, and means for swinging the driving friction disk in one direction or the other and consequently away from one or the other of the second aforesaid friction disks.

6. An automobile including a swingingly mounted motor driven friction device, two additional friction devices each of which is independently in driving relation with the two driving vehicle wheels of the automobile and both of which are driven by the first aforesaid friction device, and means for swinging the driving friction disk in one direction or the other and consequently away from one or the other of second aforesaid friction devices.

7. An automobile including a movably mounted motor driven friction disk, two additional friction disks that are flexibly supported and each of which is independently in driving relation with the two driving vehicle wheels of the automobile and both of which are driven by the aforesaid friction disk, and means for moving the driving friction disk in one direction or the other and consequently away from one or the other of the second aforesaid friction disks.

8. An automobile including a movably mounted motor driven friction device, two additional friction devices each of which is independently in driving relation with the two driving vehicle wheels of the automobile and both of which are driven by the first aforesaid friction device, and means for moving the driving friction disk in one direction or the other and consequently away from one or the other of second aforesaid friction devices.

In witness whereof, I hereunto subscribe my name this 30th day of September A. D., 1909.

JOHN L. JOHNSON.

Witnesses:
John B. Smith,
J. R. Steneck.

---

Copies of this patent may be obtained for five cents each, by addressing the "Commissioner of Patents, Washington, D. C."